Jan. 16, 1945.   S. ISAKSON   2,367,399
LOCK NUT
Filed Sept. 21, 1942
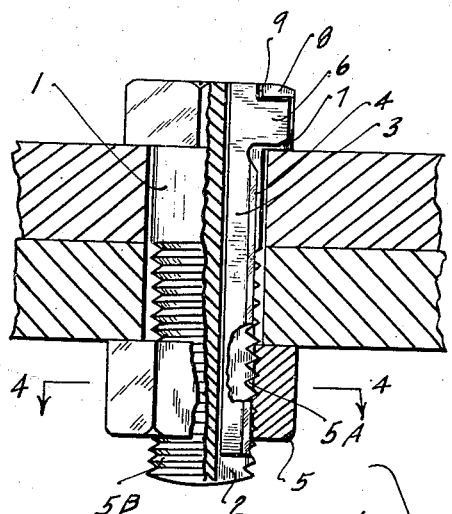
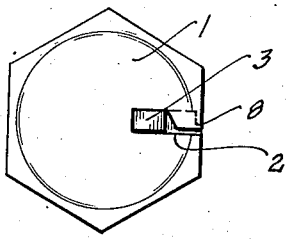
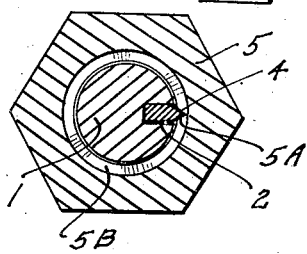
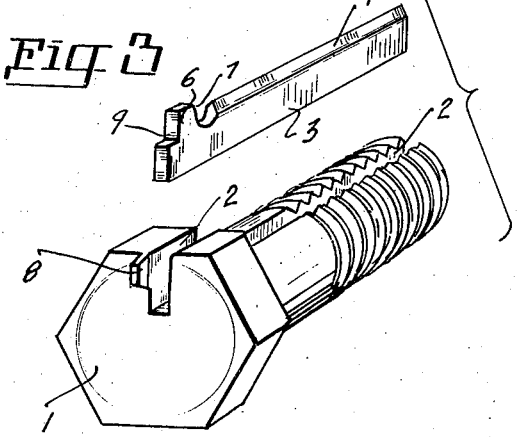
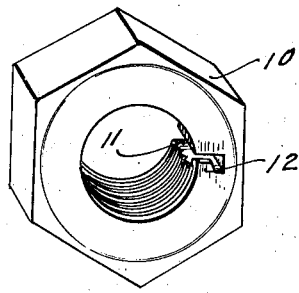
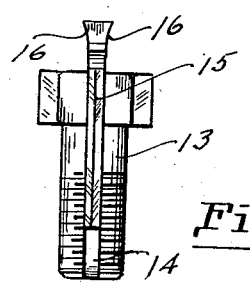
Inventor
Stig Isakson
Attorney Patented Jan. 16, 1945

2,367,399

UNITED STATES PATENT OFFICE 2,367,399

LOCK NUT

Stig Isakson, Portland, Oreg.

Application September 21, 1942, Serial No. 459,095

1 Claim. (Cl. 151—8)

This invention is directed to an improvement in locking devices for securing fixed relation between a bolt and its cooperating nut regardless of their relative positions when in cooperation.

The primary object of the invention is the provision of a locking element which may be driven into a nut or bolt formed for its cooperation, with the locking element provided with means for forming during such driving an interlocking seat in the part to be locked, to thereby prevent relative movement of the bolt and nut.

A further object of the invention is the provision of a locking element which will cooperate with the parts to be locked in any relative positions which they may assume when in use, whereby the nut, for example may be tightened on the bolt to any desired degreed relation in use, and the locking element effectively lock the parts in any such relation.

A further object of the invention is the provision of means by which the locking element may be held in locking position against casual separation, with such means readily displaced when the locking element is to be removed.

A further object of the invention is the provision of a locking element which may be readily applied and as readily removed whenever desired, with the locking element formed with means to facilitate its ready removal.

The invention is illustrated in the accompanying drawing, in which:

Fig. 1 is a sectional view, partly in elevation, showing a bolt and applied nut, with the locking element in locking position.

Fig. 2 is a plan view from the head end of the bolt.

Fig. 3 is a perspective view of the bolt and locking, the parts being shown separated.

Fig. 4 is a transverse section on the line 4—4 of Fig. 1.

Fig. 5 is an elevation of a modified arrangement of the means for holding the locking element in locking position.

Fig. 6 is a perspective view of a nut formed to receive the locking element from the nut end of the combined bolt and nut.

In the particular showing of Fig. 1, a bolt 1 of any desired or conventional form, is formed with a longitudinal-ranging slot 2, disposed diametrically thereof and opening through the head end of the bolt and through the threaded shank. The usual or any preferred nut 5 is arranged for cooperation with the recessed and threaded portion of the bolt, the threaded portion of the nut being in this form without mutilation.

A locking element 3 is utilized, comprising a bar-like element having a sectional form and size to snugly and slidably fit the slot, but with a width exceeding the depth of the slot. That portion of the element which projects beyond the slot, when in applied position is formed as a sharpened or cutting edge 4, which when the element is driven into the slot 2, following the application of the nut, will cut through the threads of the nut and form a seat to securely prevent rotation of the nut relative to the bolt.

The head end of the bolt, through which the slot 2 also extends, is formed adjacent one wall of the slot with a lip 8, which, when the locking element is in place, may be bent down over the end of the locking element and prevent endwise movement thereof. The lip 8 engages a shouldered recess 9 and fits against the shoulder to prevent outward displacement of the end of the locking element, otherwise tending to interfere with the application of a tool when necessary to the head of the bolt. The lip is readily displaced when it is desired to remove the locking element, and such locking element is additionally formed with a recess 7 for the reception of a tool to facilitate removal of the locking element, and above the recess is increased in width to engage the element with which the nut and bolt cooperate to prevent undue penetration of the element.

In Fig. 6, there is shown a nut 10, formed with a recess 11 to receive the locking element and a lip 12 to hold such element in locking position. This provision permits the locking element to initially cooperate with the nut in those conditions where the nut is the only accessible element. Of course in this form the threads of the cooperating bolt will not be initially mutilated, and the locking element will cut its way into the threads of the bolt when applied for locking purposes.

A modified form is shown in Fig. 5 wherein the bolt is formed with a slot 14 to receive the locking element. The locking element is formed with the cutting edge 15 for the same purpose as in the preferred form. In this form, however, the upper end of the locking member is formed with a wedge-form terminal 16, serving when the locking element is in position to wedge in the upper end of the recess in the bolt head and hold the locking element against casual separation.

If desired, and as preferred, the end of the locking element 3 may be recessed, as at 9 to receive the lip 8.

It will be particularly noted that the locking element forms its own locking channel while and during its application. This constitutes an important advantage, for it obviously permits full locking effect of the locking element in any relative positions of the nut and bolt. The nut may be tightened on the nut or relatively loose thereon as required in some uses, and the locking element will still be effective.

Of course, the nut may be of any form or size, and locking element will be correspondingly shaped and formed to cooperate.

Having thus described the invention, what is new is:

A nut lock, including a threaded bolt having a head at one end and a nut cooperating with the opposite end, said head and bolt being formed throughout their full axial lengths with a relatively narrow channel, a locking element including a body formed to slidably fit and substantially fill said channel throughout its full length, said body having a cutting edge portion to extend substantially to but not beyond the peripheral surface of the bolt thread when the locking element is in applied position, whereby said cutting edge will in application cut through all threads of an applied nut, the bolt-head end of the locking element being laterally enlarged and cut away in part to form an abrupt shoulder, and a lip integral with the bolt head at the upper surface thereof to be bent into the shoulder formation of the element to lock the element against lateral and endwise movement in one direction, the shoulder formation of the element and the lip formation of the head being fully within the normal contour of the bolt head to avoid interference with wrench application to said head.

STIG ISAKSON.